F. V. DOLSBY.
GRAIN DRILL COUPLING.
APPLICATION FILED APR. 26, 1919.

1,361,695.

Patented Dec. 7, 1920.

Inventor
Frank V. Dolsby.

Witnesses

By Victor J. Evans.
Attorney

UNITED STATES PATENT OFFICE.

FRANK V. DOLSBY, OF DELLVALE, KANSAS.

GRAIN-DRILL COUPLING.

1,361,695.  Specification of Letters Patent.  Patented Dec. 7, 1920.

Application filed April 26, 1919. Serial No. 292,843.

*To all whom it may concern:*

Be it known that I, FRANK V. DOLSBY, a citizen of the United States, residing at Dellvale, in the county of Norton and State of Kansas, have invented new and useful Improvements in Grain-Drill Couplings, of which the following is a specification.

This invention relates to grain drills and has for its object the provision of means for coupling together two drills whereby the operator may work upon two rows at the same time, thus saving labor of one man, this coupling member being further in the nature of an arch which will straddle an intervening row so as to prevent injury to growing corn or other crops.

An important object is the provision of a coupling of this character which is adjustable to rows of different widths, the parts being so formed that they may be secured in such adjusted position.

Another object is the provision of a coupling of this character which is so constructed that the parts may have the proper oscillatory movement with respect to one another whereby to accommodate irregularities in the ground.

An additional object is the provision of a device of this character which will be very simple and inexpensive in manufacture, which may be easily attached even by an unskilled person, which will be efficient in service, durable in use, and a general improvement in the art.

With the above and other objects and advantages in view, the invention consists in the details of construction to be hereinafter more fully described and claimed, and illustrated in the accompanying drawing, in which—

Figure 1:
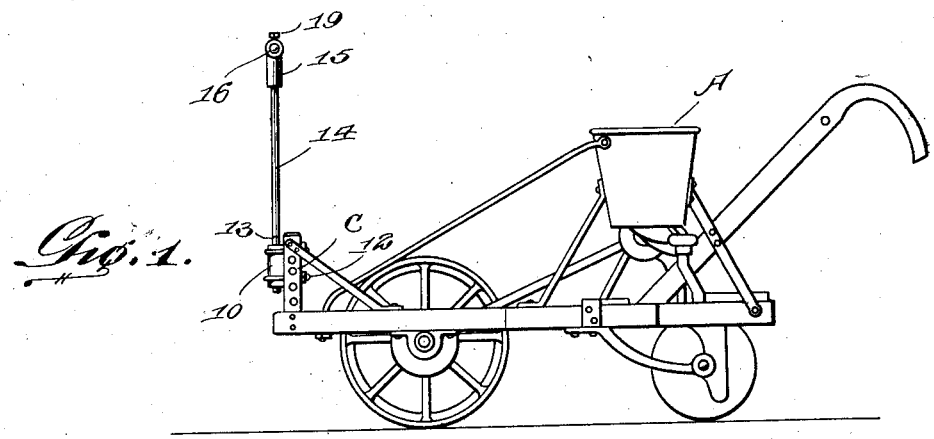
Figure 1 is a side elevation of my device connected with a pair of one horse grain drills.
Figure 2:
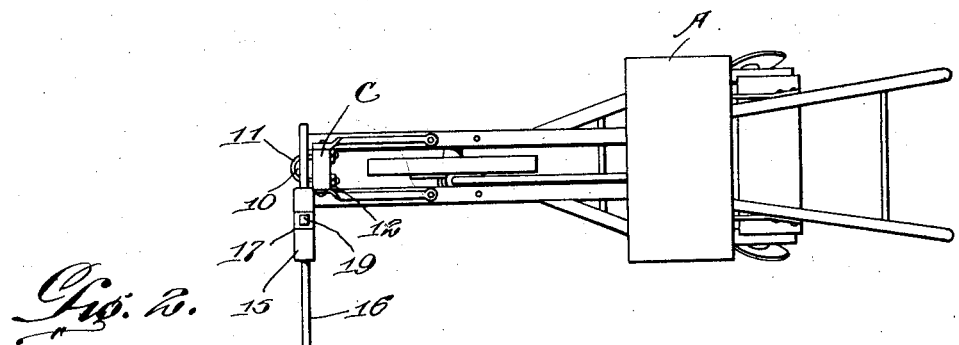
Fig. 2 is a plan view of so much of the drills as is necessary to illustrate the application of the invention.

Referring more particularly to the drawing, the letters A and B designate the one horse grain drills which include the draw bars C which of course form no part of this invention.

In carrying out my invention I provide the bearing member 10 clamped upon each of the draw bars C, as for instance by a pair of U bolts 11 disposed in encircling relation to the bearing member 10 and provided with clamping nuts 12. Engaged within each of the bearing members 10 is a crank portion 13 which is offset laterally with respect to the lower end of a vertically extending rod 14. Each rod 14 has secured upon its upper end a T-shaped bearing member 15 which has its upper portion slidably receiving one end of a horizontally extending rod or tube 16. The central portion of the upper end of each member 15 is cut away, as shown at 17, for the accommodation of a stop sleeve 18 disposed upon the rod 16 and held in adjusted position to agree with the distance between the grain rows by means of set screws 19.

In applying my attachment, the rods 14 have their crank portions 13 disposed within the bearings 10 after which the drills A and B are moved apart the proper distance, depending upon the distance between the rows of corn or other grain, it being understood that at this time the set screws 19 are loosened so that the sleeves 18 may slide upon the rod 16. After the proper adjustment is made the set screws 19 are tightened whereupon the bearing members 15 will be held spaced apart the proper distance to agree with the distance between the drills.

Figure 3:
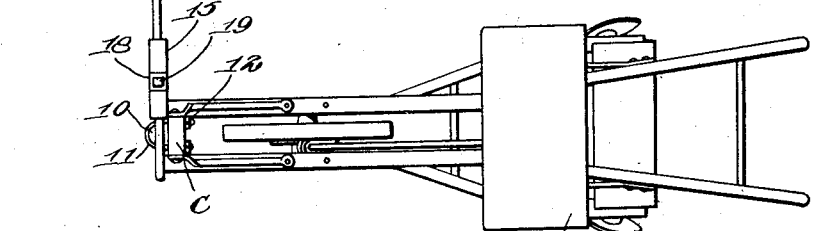
Fig. 3 is a cross sectional view showing my attachment in front elevation.

The provision of the crank or offset portions 13 is an important feature. One advantage is that maximum adjustment of the separate seeder or cultivator units may be had. If, with the rods 14 in the position shown in Fig. 3, the parts 15 were brought together on the rod 16, the units A and B would still be some distance apart, and were it desired to operate them together the position of the rods 14 could be reversed, or in other words turned around on an arc of one hundred and eighty degrees in the bearings 10, which will permit the units A and B being brought directly together. Turned to the position shown in Fig. 3 again, they can be arranged farther apart than the length of the rod 16 would permit were the rods 14 straight instead of being provided with an offset. Another advantage is that these offsets provide shoulders which limit the downward movement of the rods 14 in the bearings 10.

It will of course be seen that the operation of a pair of drills connected by my device is exactly the same as the operation of a single drill, my device merely enabling the two drills to be worked simultaneously at the proper spaced relation.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A coupling of the character described comprising a pair of vertically disposed bearing members adapted to be clamped upon the draw-bars of implements, a vertically extending rod having its lower end laterally offset and revolubly engaged within each bearing member, a T-shaped bearing member secured upon the upper end of each rod, the upper portion of each T-shaped bearing member being provided with a cut out portion, a horizontally disposed connecting rod slidably engaged within said T-shaped bearing members, a stop collar slidably engaging upon said horizontal rod within each cut out portion, and means for securing said stop collars upon said horizontal rod in adjusted positions whereby the distance between said vertical rods may be varied.

2. A coupling of the character described comprising a pair of bearing members secured in vertical position upon the drawbars of implements, a pair of vertical rods each being offset laterally outwardly and bent to provide a vertical arm extending downwardly from the offset portion, said vertical arms being received within said bearing members, and a rod adjustably connected with the upper ends of said vertical rods whereby the distance therebetween may be varied.

In testimony whereof I affix my signature.

FRANK V. DOLSBY.